(12) United States Patent
Tomita et al.

(10) Patent No.: US 12,449,053 B2
(45) Date of Patent: *Oct. 21, 2025

(54) FOOT VALVE ASSEMBLY AND SUBMERGED PUMP SYSTEM

(71) Applicant: NIKKISO CO., LTD., Tokyo (JP)

(72) Inventors: Yasuo Tomita, Tokyo (JP); Motoyasu Ogawa, Tokyo (JP); Masaaki Eguchi, Saitama (JP)

(73) Assignee: NIKKISO CO., LTD., Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 18/157,291

(22) Filed: Jan. 20, 2023

(65) Prior Publication Data

US 2023/0265933 A1    Aug. 24, 2023

(30) Foreign Application Priority Data

Feb. 22, 2022   (JP) .................................. 2022-025665

(51) Int. Cl.
| | |
|---|---|
| *F16K 17/36* | (2006.01) |
| *F16K 24/06* | (2006.01) |
| *F17C 13/04* | (2006.01) |

(52) U.S. Cl.
CPC ............. *F16K 17/36* (2013.01); *F16K 24/06* (2013.01); *F17C 13/04* (2013.01); *F17C 2205/0323* (2013.01); *F17C 2221/01* (2013.01); *F17C 2221/033* (2013.01); *F17C 2227/0135* (2013.01)

(58) Field of Classification Search
CPC ...... F16K 15/035; F16K 17/04; F16K 15/148; F16K 17/36; F16K 17/02; F04D 29/628; F04D 1/06; F04D 13/08; F04D 29/007; F04D 29/086; F17C 13/04; F05D 2210/11; F05D 2240/55

See application file for complete search history.

(56) References Cited

U.S. PATENT DOCUMENTS

| | | | | |
|---|---|---|---|---|
| 1,829,704 | A | * 10/1931 | Kruse | .................... F04D 9/008 |
| | | | | 415/121.2 |
| 3,369,715 | A | * 2/1968 | Carter | .................. F04D 29/608 |
| | | | | 415/199.2 |
| 3,876,120 | A | * 4/1975 | Haesloop | .............. F04D 29/608 |
| | | | | 222/333 |

(Continued)

FOREIGN PATENT DOCUMENTS

| | | |
|---|---|---|
| JP | H5-078992 A | 3/1993 |
| JP | 2017-132619 A | 8/2017 |

*Primary Examiner* — Essama Omgba
*Assistant Examiner* — Lilya Pekarskaya
(74) *Attorney, Agent, or Firm* — WCF IP

(57) ABSTRACT

A foot valve assembly according to the present invention includes: a cylindrical adapter attached to a lower opening end of a cylindrical pump column configured to accommodate a pump configured to be submerged in a handling liquid, the adapter configured to accommodate a suction port of the pump; a disc-shaped valve disc configured to open and close a lower opening of the adapter corresponding to raising and lowering of the pump; a biasing member that biases the valve disc toward the adapter; and an auxiliary valve configured to open and close corresponding to the raising and lowering of the pump and configured to assist in opening the valve disc when the valve disc is closed.

3 Claims, 9 Drawing Sheets

(56) References Cited

U.S. PATENT DOCUMENTS

| | | | |
|---|---|---|---|
| 3,963,381 A * | 6/1976 | Kohnen | F04D 13/16 |
| | | | 415/157 |
| 4,080,106 A * | 3/1978 | Haesloop | F04D 29/086 |
| | | | 222/333 |
| 2006/0120904 A1* | 6/2006 | Haesloop | F04D 1/063 |
| | | | 417/423.1 |
| 2011/0085919 A1* | 4/2011 | Williams | F04B 49/02 |
| | | | 417/63 |

* cited by examiner

FOOT VALVE ASSEMBLY AND SUBMERGED PUMP SYSTEM

TECHNICAL FIELD

The present invention relates to a foot valve assembly and a submerged pump system.

BACKGROUND ART

A submerged pump system is used to remove liquefied gas from a storage tank in which the liquefied gas (liquefied natural gas, liquefied ammonia, etc.) is stored. A pump (submerged pump) is accommodated in a pump column that is provided extending from a ceiling of the storage tank into the liquefied gas and is submerged in the liquefied gas. A lower opening end of the pump column is opened and closed by a foot valve assembly.

In the submerged pump system, the pump is taken out of the storage tank for maintenance, for example. When the pump stops, the pump column is filled with residual liquefied gas and vaporized liquefied gas (vaporized gas). When the head plate is removed in this state, the liquefied gas and the vaporized gas (hereinafter collectively referred to as "residual gas") leak to the outside. Since much of the residual gas is flammable and toxic, the residual gas needs to be removed prior to the removal of the head plate. To remove the residual gas, a technique has been used in which an inert gas such as nitrogen is introduced into the pump column while a valve disc of the foot valve assembly is closed (for example, see JP 2017-132619 A).

The valve disc is biased upward, i.e., in a valve disc-closing direction by a spring and opens under the own weight of the pump when the pump is in operation (for example, see JP 5-78992 U). Accordingly, when the pump is raised, the valve disc is closed by the biasing force of the spring. When an inert gas is introduced into the pump column in this state, the residual gas is returned into the storage tank while slightly opening the valve disc, and the residual gas inside the pump column is removed (purged) by the inert gas.

The biasing force by the spring and the liquid pressure depending on liquid volume (liquid level) of the liquefied gas in the storage tank are applied to the valve disc after the purging in the valve disc-closing direction. As a result, the valve disc is closed, and a protruding portion of the valve disc is pressed against an opposing elastic material, and thus the foot valve assembly is sealed. That is, the sealability of the foot valve assembly depends on the biasing force and the liquid pressure. As the liquid volume (the liquid level) of the liquefied gas in the storage tank decreases, the liquid pressure decreases, and the sealability of the foot valve assembly may decrease. As a result, a small amount of liquefied gas may leak into the foot valve assembly (inside the pump column) during maintenance work. If the biasing force is increased in order to prevent the leakage of the liquefied gas, the valve disc hardly opens under the own weight of the pump alone, particularly in a state where the liquid pressure is large. In this case, an auxiliary operation of increasing the pressure in the pump column with the gas introduced into the pump column and assisting in opening of the valve disc is required.

SUMMARY OF INVENTION

Technical Problem

An object of the present invention is to stably open a valve disc of a foot valve assembly under the own weight of a pump while ensuring the sealability of the foot valve assembly in a submerged pump system.

Solution to Problem

A foot valve assembly according to one aspect of the present invention includes a cylindrical adapter attached to a lower opening end of a cylindrical pump column configured to accommodate a pump configured to be submerged in a handling liquid, the adapter configured to accommodate a suction port of the pump; a disc-shaped valve disc configured to open and close a lower opening of the adapter corresponding to raising and lowering of the pump; a biasing member that biases the valve disc toward the adapter; and an auxiliary valve configured to open and close corresponding to the raising and lowering of the pump and configured to assist in opening the valve disc when the valve disc is closed.

A submerged pump system according to one aspect of the present invention includes a pump configured to be submerged in a handling liquid, a cylindrical pump column configured to accommodate the pump, and the aforementioned foot valve assembly.

Advantageous Effects of Invention

The present invention is able to stably open the valve disc of the foot valve assembly under the own weight of the pump while ensuring the sealability of the foot valve assembly in the submerged pump system.

DESCRIPTION OF EMBODIMENTS

Figure 1:
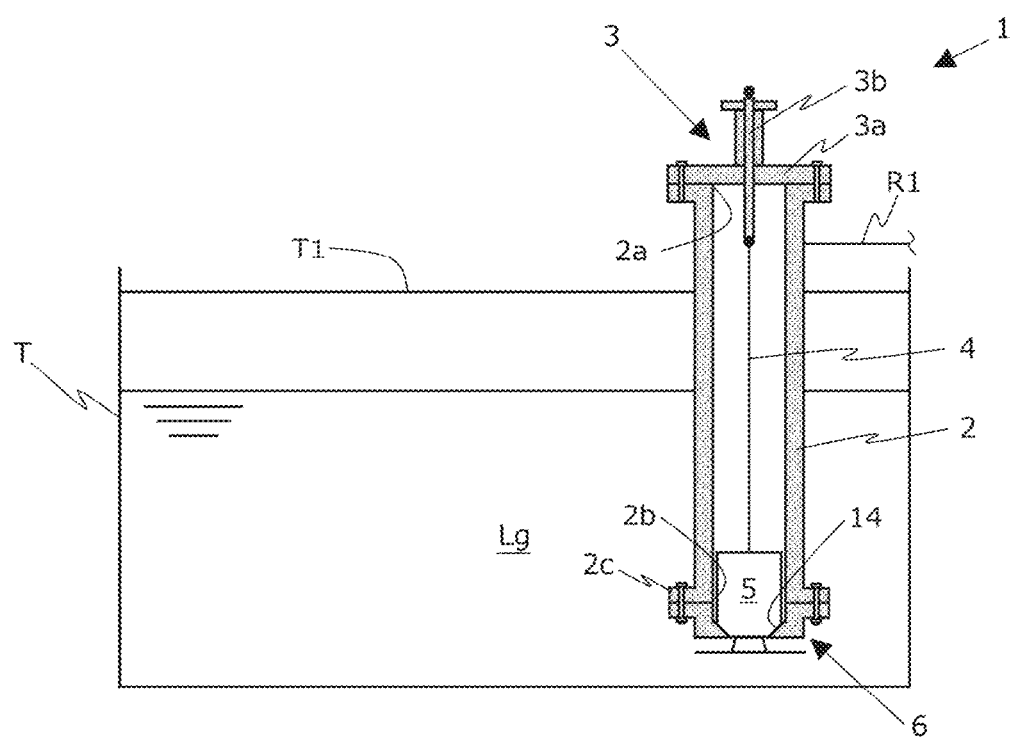
FIG. 1 is a cross-sectional view of a submerged pump system illustrating an embodiment of the submerged pump system according to the present invention.

Embodiments of a submerged pump system and a foot valve assembly according to the present invention will be described below with reference to the drawings. In the drawings, the same members and components are indicated with the same reference signs, and repetitive description thereof will be omitted. In the drawings, a shape and size of each member are intentionally emphasized and illustrated more than the actual dimensions thereof in order to clarify the configuration of each member.

In the following description and drawings, "downward" is the direction of gravity, and "upward" is the opposite direction of downward.

Submerged Pump System

First, an embodiment of the submerged pump system according to the present invention will be described.

Configuration of Submerged Pump System

FIG. 1 is a schematic cross-sectional view of the submerged pump system illustrating the embodiment of the submerged pump system according to the present invention.

A submerged pump system 1 is attached to a storage tank T in which liquefied gas Lg is stored and feeds the liquefied gas Lg from the storage tank T to the outside. The submerged pump system 1 includes a pump column 2, a sealing member 3, a support cable 4, a submerged pump (hereinafter referred to as "pump") 5, and a foot valve assembly 6. In the present embodiment, the liquefied gas is liquefied ammonia. The liquefied ammonia is an example of a handling liquid in the present invention.

Note that, in the present invention, the handling liquid is not limited to the liquefied ammonia. That is, for example, the handling liquid may be liquefied natural gas.

The pump column 2 accommodates the pump 5 and also functions as a liquid feeding path for the liquefied gas Lg discharged from the pump 5. The pump column 2 has a cylindrical shape. The pump column 2 is disposed penetrating a ceiling T1 of the storage tank T and provided extending from the ceiling T1 into the liquefied gas Lg. A liquid feeding path R1 for the liquefied gas Lg is connected to an upper outer peripheral surface of the pump column 2. In a radial direction of the pump column 2, a lower end portion of the pump column 2 protrudes outward and constitutes a lower flange portion 2c.

The sealing member 3 liquid-tightly seals an upper opening end 2a of the pump column 2 and also suspends and supports the pump 5 via the support cable 4 when the pump 5 is raised and lowered in the pump column 2. The sealing member 3 includes a head plate 3a that covers the upper opening end 2a of the pump column 2 and a lift shaft 3b that is disposed penetrating the head plate 3a. The lift shaft 3b is raised and lowered when the pump 5 is raised and lowered, thereby supporting the pump 5 via the support cable 4.

The support cable 4 suspends and supports the pump 5 when raising and lowering the pump 5 in the pump column 2. The support cable 4 is made of a metal wire, for example. The support cable 4 is connected to the lift shaft 3b and the pump 5.

The pump 5 discharges, into the pump column 2, the liquefied gas Lg flowing in from the foot valve assembly 6. The pump 5 is, for example, a known submerged pump including a multi-stage centrifugal pump and a motor that drives the multi-stage centrifugal pump. The power of the pump 5 is supplied via a power cable (not illustrated) connected to the sealing member 3. The pump 5 is accommodated in a lower portion of the pump column 2 and is submerged in the liquefied gas Lg. The pump 5 is raised and lowered in the pump column 2 between a lowered position and a raised position corresponding to the raising and lowering of the lift shaft 3b.

The "lowered position" is a position where the pump 5 is not raised by the lift shaft 3b and is supported by an inclined surface 14 described later of the foot valve assembly 6. The "raised position" is a position where the pump 5 is suspended (raised) by the lift shaft 3b via the support cable 4 when the lift shaft 3b is raised to a predetermined height.

The foot valve assembly 6 opens and closes a lower opening end 2b of the pump column 2. A specific configuration of the foot valve assembly 6 will be described later.

Configuration of Foot Valve Assembly

Next, the specific configuration of the foot valve assembly 6 according to the present invention will be described.

Figure 2:
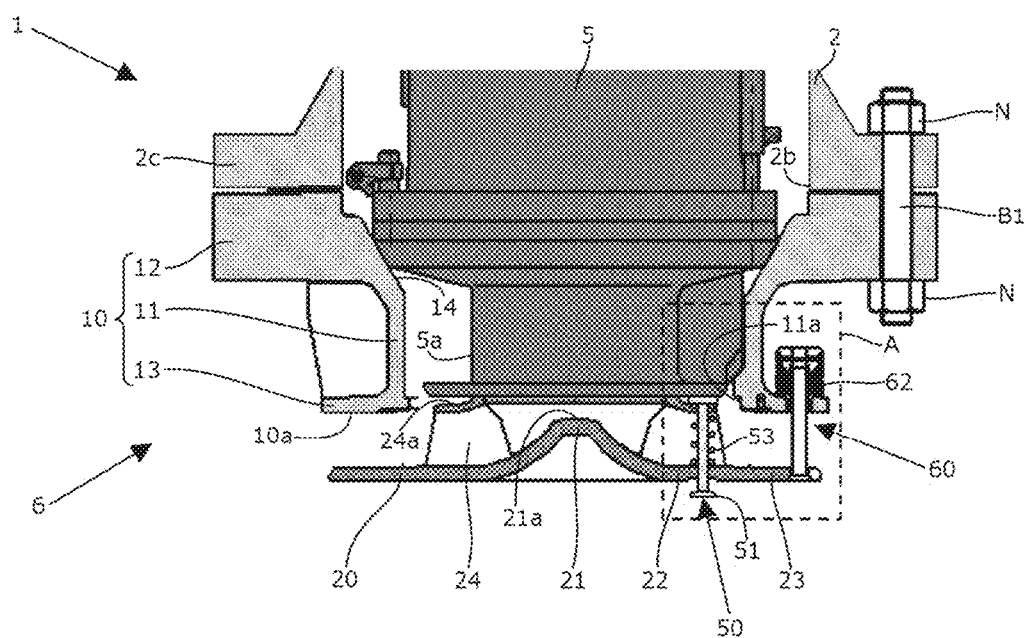
FIG. 2 is a cross-sectional view of a foot valve assembly illustrating an embodiment of the foot valve assembly according to the present invention.

FIG. 2 is a cross-sectional view of the foot valve assembly 6 illustrating the embodiment of the foot valve assembly 6 according to the present invention.

Figure 3:
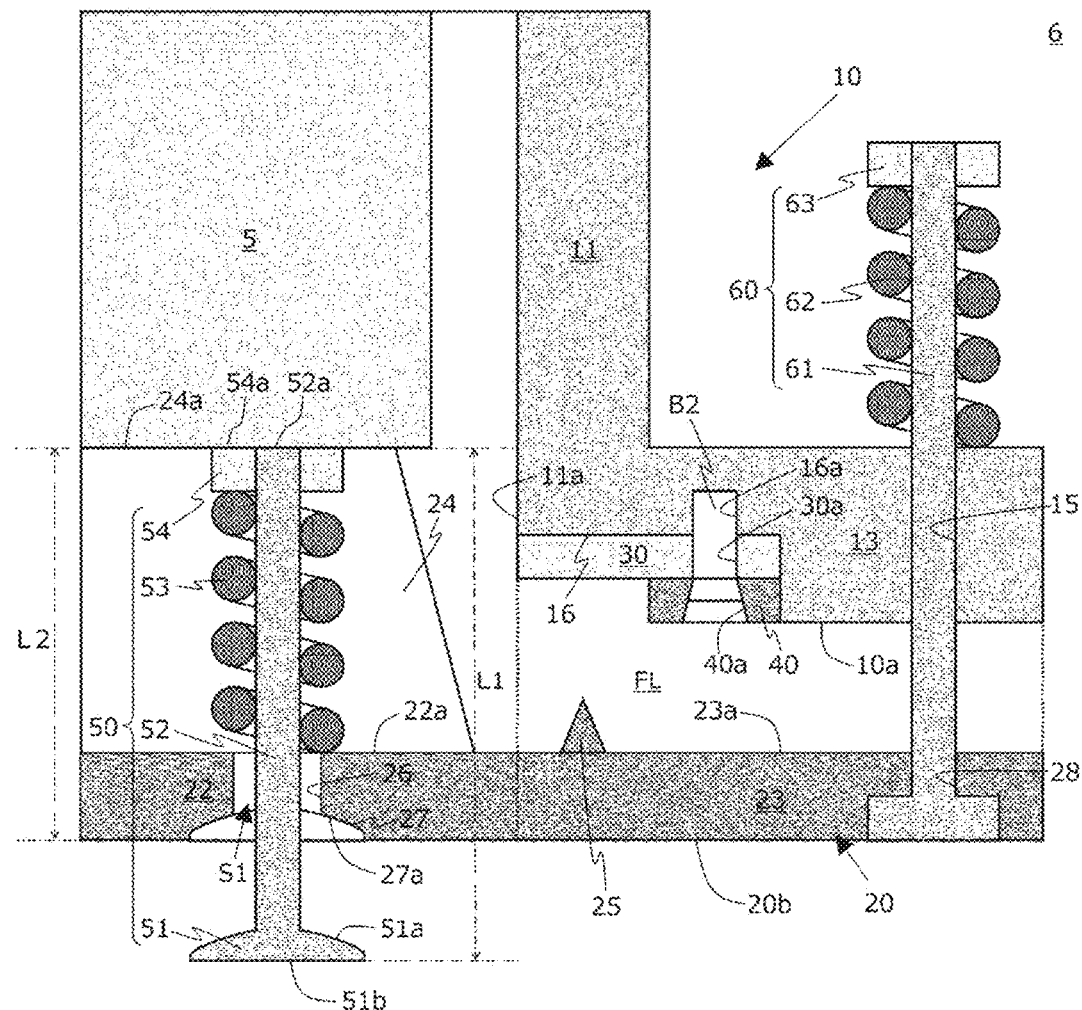
FIG. 3 is a schematic enlarged cross-sectional view of the foot valve assembly enlarging a part A of the foot valve assembly in FIG. 2.

FIG. 3 is a schematic enlarged cross-sectional view of the foot valve assembly 6 enlarging a part A of the foot valve assembly 6 in FIG. 2.

FIG. 2 and FIG. 3 each illustrate the foot valve assembly 6 when the pump 5 is located in the lowered position. FIG. 2 also illustrates lower portions of the pump column 2 and the pump 5 for convenience of description. In the following description, a bolt hole for a first attaching bolt B1 described later is a well-known technique, and the description thereof will be omitted. In the following description, FIG. 1 will be referred to as necessary.

The foot valve assembly 6 includes an adapter 10, a valve disc 20, a sealing member 30, a pressing plate 40, an auxiliary valve 50, a plurality of biasing units 60, a plurality of first attaching bolts B1, a plurality of second attaching bolts B2, and attaching nuts N.

The adapter 10 is a member that is used to attach the valve disc 20 to the pump column 2 and functions as a housing for the foot valve assembly 6. The adapter 10 includes a cylindrical body portion 11, a first flange portion 12, a second flange portion 13, the inclined surface 14, a plurality of insertion holes 15, and a recess portion 16.

The cylindrical body portion 11 accommodates a suction port (a suction manifold) 5a, which is disposed at a lower end portion of the pump 5. The cylindrical body portion 11 has a substantially cylindrical shape. In the following description of the adapter 10, the "radial direction" means the radial direction of the cylindrical body portion 11, and the "circumferential direction" means the circumferential direction of the cylindrical body portion 11.

In the radial direction, an upper end portion of the cylindrical body portion 11 protrudes outward and constitutes the ring plate-shaped first flange portion 12. In the radial direction, a lower end portion of the cylindrical body portion 11 protrudes outward and constitutes the ring plate-shaped second flange portion 13. That is, the cylindrical body portion 11 is integrally formed with the first flange portion 12 and the second flange portion 13.

In the vertical direction, an upper half portion of an inner peripheral surface of the cylindrical body portion 11 is continuously expanded from the center to the upper end and constitutes the inclined surface 14.

The insertion hole 15 is a through hole penetrating the second flange portion 13 in the vertical direction. In the circumferential direction, the insertion holes 15 are disposed at equal intervals on an outer edge portion of the second flange portion 13.

An area on an inner edge side of a lower end surface 10a of the adapter 10 (a lower surface of the cylindrical body portion 11 and the second flange portion 13, the same applies below) is recessed upward in a ring plate shape and constitutes the recess portion 16. The recess portion 16 includes a plurality of internal thread holes 16a. In the circumferential direction, the internal thread holes 16a are disposed at equal intervals in the recess portion 16.

The first flange portion 12 is fastened to the lower flange portion 2c of the pump column 2 with the first attaching bolt B1 and the attaching nuts N, and thus the adapter 10 is attached to the lower opening end 2b of the pump column 2.

The valve disc 20 opens and closes a lower opening 11a of the cylindrical body portion 11 (i.e., the lower opening of the adapter 10). The valve disc 20 has a disc shape. The diameter of the valve disc 20 is substantially the same as the outer diameter of the second flange portion 13 of the adapter 10. The valve disc 20 includes a convex portion 21, a rectifying portion 22, a flow path defining portion 23, a plurality of eddy dissipation plates 24, a protruding portion 25, an insertion hole 26, a recess portion 27, and a plurality of fitting holes 28. In the following description of the valve disc 20, the "radial direction" means the radial direction of the valve disc 20, and the "circumferential direction" means the circumferential direction of the valve disc 20.

A central portion of the valve disc 20 protrudes upward in a substantially conical (mountainous) shape and constitutes the convex portion 21. The convex portion 21 reinforces the valve disc 20 and guides the liquefied gas Lg flowing in from an inflow path FL to the pump 5.

The rectifying portion 22 rectifies the liquefied gas Lg flowing in from the inflow path FL. The rectifying portion 22 is a portion of the valve disc 20 from an outer edge portion (a gently sloped portion) of the convex portion 21 to the inside of the flow path defining portion 23 described later.

The flow path defining portion 23 is a portion of the valve disc 20 located below the lower end surface 10a of the adapter 10. That is, the flow path defining portion 23 is a portion on the outer edge side of the valve disc 20. As described later, an upper surface 23a of the flow path defining portion 23 defines, between the upper surface 23a and the lower end surface 10a, the inflow path FL that allows the liquefied gas Lg to flow toward the pump 5 when the valve disc 20 is open.

The eddy dissipation plate 24 eliminates or reduces the occurrence of eddy in the liquefied gas Lg flowing in from the inflow path FL. The eddy dissipation plate 24 has a substantially trapezoidal plate shape. The eddy dissipation plate 24 is disposed on an upper surface 22a of the rectifying portion 22 in such a way that two side surfaces of the eddy dissipation plate 24 are along the radial direction. In the circumferential direction, the eddy dissipation plates 24 are disposed at equal intervals. An upper surface 24a of the eddy dissipation plate 24 is located above a top surface 21a of the convex portion 21.

The protruding portion 25 seals the inflow path FL together with the sealing member 30 when the valve disc 20 is closed. In the flow path defining portion 23, a part of the area located below the recess portion 16 protrudes upward in a ring shape and constitutes the protruding portion 25. In the radial direction, the cross-sectional shape of the protruding portion 25 is an upward convex triangle.

The insertion hole 26 is a through hole penetrating the valve disc 20 in the vertical direction. The insertion hole 26 is an example of a communication hole in the present invention. The insertion hole 26 is disposed at the rectifying portion 22 of the valve disc 20. In the present embodiment, the insertion hole 26 is disposed between the two eddy dissipation plates 24. A lower end portion of the insertion hole 26 is continuously expanded in diameter and constitutes the hemispherical-shaped recess portion 27. In other words, on a lower surface 20b of the valve disc 20, the circumference of the insertion hole 26 is recessed upward in a hemispherical shape, which constitutes the recess portion 27. The shape of an inner surface (a lower surface) 27a of the recess portion 27 is a hemispherical shape along a shape of an upper surface 51a of an auxiliary valve disc 51 described later.

The fitting hole 28 is a through hole penetrating the flow path defining portion 23 in the vertical direction. In the circumferential direction, the fitting holes 28 are disposed at equal intervals at positions facing the insertion holes 15.

The valve disc 20 is attached to the adapter 10 so as to be able to open and close the lower opening 11a of the cylindrical body portion 11 with the biasing unit 60. In this case, the protruding portion 25 is disposed facing the sealing member 30 and protrudes from the upper surface 23a of the flow path defining portion 23 toward the sealing member 30.

The sealing member 30 seals the inflow path FL together with the protruding portion 25 when the valve disc 20 is closed. The sealing member 30 is a ring plate-shaped gasket, for example. The material of the sealing member 30 is a fluorine resin such as polytetrafluoroethylene (PTFE), for example. The sealing member 30 is disposed in the recess portion 16. The sealing member 30 includes a plurality of insertion holes 30a. In the circumferential direction of the sealing member 30, the insertion holes 30a are disposed at equal intervals at positions facing the internal thread holes 16a.

The pressing plate 40 fixes the sealing member 30 to the recess portion 16. The pressing plate 40 has a ring plate shape, for example. The pressing plate 40 is disposed in the recess portion 16. The pressing plate 40 includes a plurality of insertion holes 40a. In the circumferential direction of the pressing plate 40, the insertion holes 40a are disposed at equal intervals at positions facing the insertion holes 30a of the sealing member 30.

The second attaching bolt B2 disposed through the two insertion holes 30a and 40a is screwed into the internal thread hole 16a, and thus the sealing member 30 and the pressing plate 40 are attached to the recess portion 16. In this case, the sealing member 30 is held between the recess portion 16 and the pressing plate 40.

The auxiliary valve 50 opens and closes the insertion hole 26. The auxiliary valve 50 is a poppet valve, for example. The auxiliary valve 50 includes the auxiliary valve disc 51, a shaft member 52, a spring 53, and a retainer 54.

The auxiliary valve disc 51 opens and closes the insertion hole 26. The auxiliary valve disc 51 has a circular shape in a plan view. The shape of the upper surface 51a of the auxiliary valve disc 51 is an upwardly convex hemispherical shape. The central portion of the upper surface 51a of the auxiliary valve disc 51 protrudes upward in a columnar shape and constitutes the shaft member 52. That is, the auxiliary valve disc 51 is integrally formed with the shaft member 52.

The shaft member 52 guides the opening and closing of the auxiliary valve disc 51 and the extension and contraction of the spring 53. The shaft member 52 has a columnar shape along the vertical direction. The shaft member 52 is disposed through the insertion hole 26 of the valve disc 20 from below. The diameter of the shaft member 52 is smaller than the inner diameter of the insertion hole 26. Thus, a cylindrical-shaped gap (hereinafter referred to as "cylindrical space S1") exists between the shaft member 52 and the insertion hole 26.

The spring 53 extends and contracts along the shaft member 52 and biases the auxiliary valve disc 51 toward the closing direction of the auxiliary valve disc 51 (the direction to the valve disc 20 side, i.e., upward). The spring 53 is a coil spring, for example. The spring 53 is disposed above the rectifying portion 22 of the valve disc 20. Apart of the shaft member 52 that protrudes above the valve disc 20 is disposed through the spring 53. The spring 53 is an example of an auxiliary biasing member in the present invention.

The retainer 54 fixes the position of one end portion (upper end portion) of the spring 53 relative to the shaft member 52. The retainer 54 has a ring plate shape, for example. The retainer 54 is attached to an upper end portion of the shaft member 52 with the upper end portion of the spring 53 pressed downward. As a result, the spring 53 is disposed between the retainer 54 and the rectifying portion 22. The spring 53 biases the retainer 54 upward, thereby biasing the auxiliary valve disc 51 upward, i.e., toward the valve disc 20 side via the shaft member 52.

In the vertical direction, the length L1 of the auxiliary valve 50 (i.e., the length from a lower surface 51*b* of the auxiliary valve disc 51 to an upper end surface 52*a* of the shaft member 52, i.e., an upper surface 54*a* of the retainer 54) is longer than the length L2 from the lower surface 20*b* of the valve disc 20 to the upper surface 24*a* of the eddy dissipation plate 24. That is, when the auxiliary valve disc 51 is closed, the upper portion of the shaft member 52 and the retainer 54 protrude above the upper surface 24*a* of the eddy dissipation plate 24.

The biasing unit 60 is used to attach the valve disc 20 to the adapter 10 and also biases the valve disc 20 toward the adapter 10 side. The biasing unit 60 includes a shaft member 61, a spring 62, and a retainer 63.

The shaft member 61 guides the extension and contraction of the spring 62. The shaft member 61 has a columnar shape along the vertical direction. The shaft member 61 is disposed through the fitting hole 28 of the valve disc 20 and the insertion hole 15 of the adapter 10 from below. A lower portion of the shaft member 61 is fitted into the fitting hole 28. A part of the shaft member 61 protrudes above the second flange portion 13.

The spring 62 extends and contracts along the shaft member 61 and biases the valve disc 20 toward the closing direction of the valve disc 20 (the direction to the adapter 10 side, i.e., upward). The spring 62 is a coil spring, for example. The spring 62 is disposed above the second flange portion 13. The part of the shaft member 61 that protrudes above the second flange portion 13 is disposed through the spring 62. The spring 62 is an example of a biasing member in the present invention.

The retainer 63 fixes the position of one end portion (upper end portion) of the spring 62 relative to the shaft member 61. The retainer 63 has a ring plate shape, for example. The retainer 63 is attached to an upper end portion of the shaft member 61 with the upper end portion of the spring 62 pressed downward. As a result, the spring 62 is disposed between the retainer 63 and the second flange portion 13. The spring 62 biases the retainer 63 upward, thereby biasing the valve disc 20 upward, i.e., toward the adapter 10 side, via the shaft member 61.

Operation of Foot Valve Assembly

Next, operations of the foot valve assembly 6 will be described with a focus on opening and closing operations of the valve disc 20 and the auxiliary valve disc 51. In the following description, FIG. 1 to FIG. 3 will be referred to as necessary.

The valve disc 20 and the auxiliary valve disc 51 are opened when the own weight of the pump 5, i.e., a load from the pump 5 (hereinafter referred to as "pump load") is applied, and the valve disc 20 and the auxiliary valve disc 51 are closed when the pump load is removed. In this way, the valve disc 20 and the auxiliary valve disc 51 are opened and closed corresponding to the raising and lowering of the pump 5.

Operation When Pump is in Lowered Position

Figure 4:
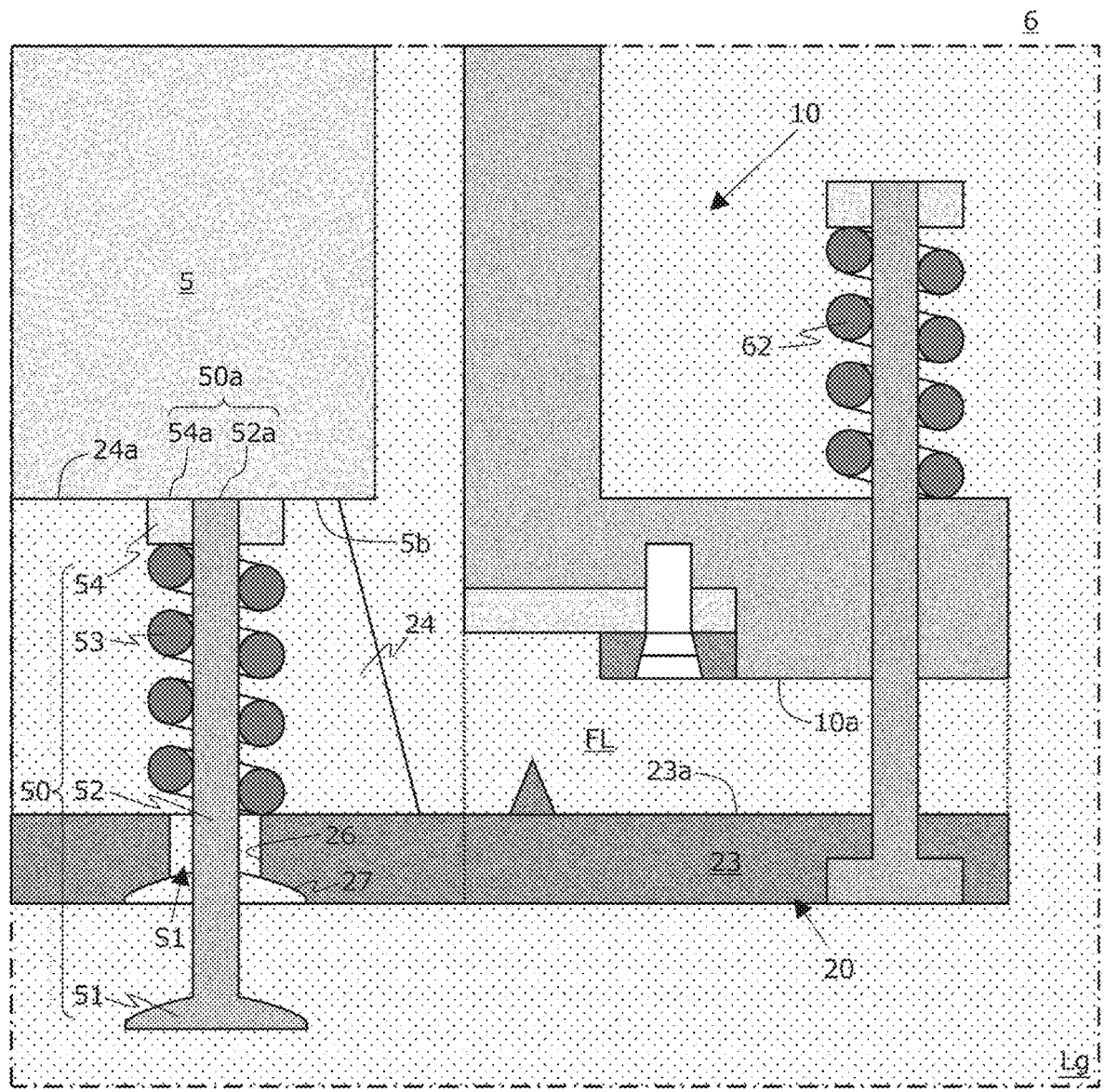
FIG. 4 is a schematic enlarged cross-sectional view of the foot valve assembly when a pump included in the submerged pump system in FIG. 1 is located in a lowered position, the view enlarging the part A of the foot valve assembly in FIG. 2.

FIG. 4 is a schematic enlarged cross-sectional view of the foot valve assembly 6 when the pump 5 is located in the lowered position, the view enlarging the part A of the foot valve assembly 6 in FIG. 2.

In order to clarify an area where the liquefied gas Lg is present, the figure and the following figures (FIG. 5 to FIG. 9) illustrate the area with a dot pattern.

First, when the pump 5 is located in the lowered position, a part of the pump 5 abuts on the inclined surface 14, and a lower end surface 5*b* of the pump 5 abuts on the upper surface 24*a* of the eddy dissipation plate 24 and the upper surface (the upper end surface 52*a* of the shaft member 52 and the upper surface 54*a* of the retainer 54) 50*a* of the auxiliary valve 50. In this case, the pump load is applied to the valve disc 20 in the valve disc-opening direction (the downward direction), and a biasing force of the spring 62 (hereinafter simply referred to as "biasing force") is applied to the valve disc 20 in the valve disc-closing direction (the upward direction). The biasing force is smaller than the pump load, and the valve disc 20 is opened by the pump load. The pump load is applied to the auxiliary valve 50 in the opening direction of the auxiliary valve disc 51 (the downward direction), and a biasing force of the spring 53 (hereinafter referred to as "auxiliary biasing force") is applied to the auxiliary valve 50 in the closing direction of the auxiliary valve disc 51 (the upward direction). The auxiliary biasing force is smaller than the pump load and the biasing force, and the auxiliary valve disc 51 is opened by the pump load.

When the valve disc 20 is opened, the inflow path FL is defined between the lower end surface 10*a* of the adapter 10 and the upper surface 23*a* of the flow path defining portion 23. As a result, the liquefied gas Lg flows in from the storage tank T into a space between the eddy dissipation plates 24 via the inflow path FL. Then, the liquefied gas Lg is rectified by the eddy dissipation plates 24 and guided by the convex portion 21 to the pump 5. When the auxiliary valve disc 51 is opened, a small amount of liquefied gas Lg flows in from the storage tank T into a space between the two eddy dissipation plates 24 via the recess portion 27 and the insertion hole 26 (the cylindrical space S1).

Operation while Pump is Raised from Lowered Position Toward Raised Position

Figure 5:
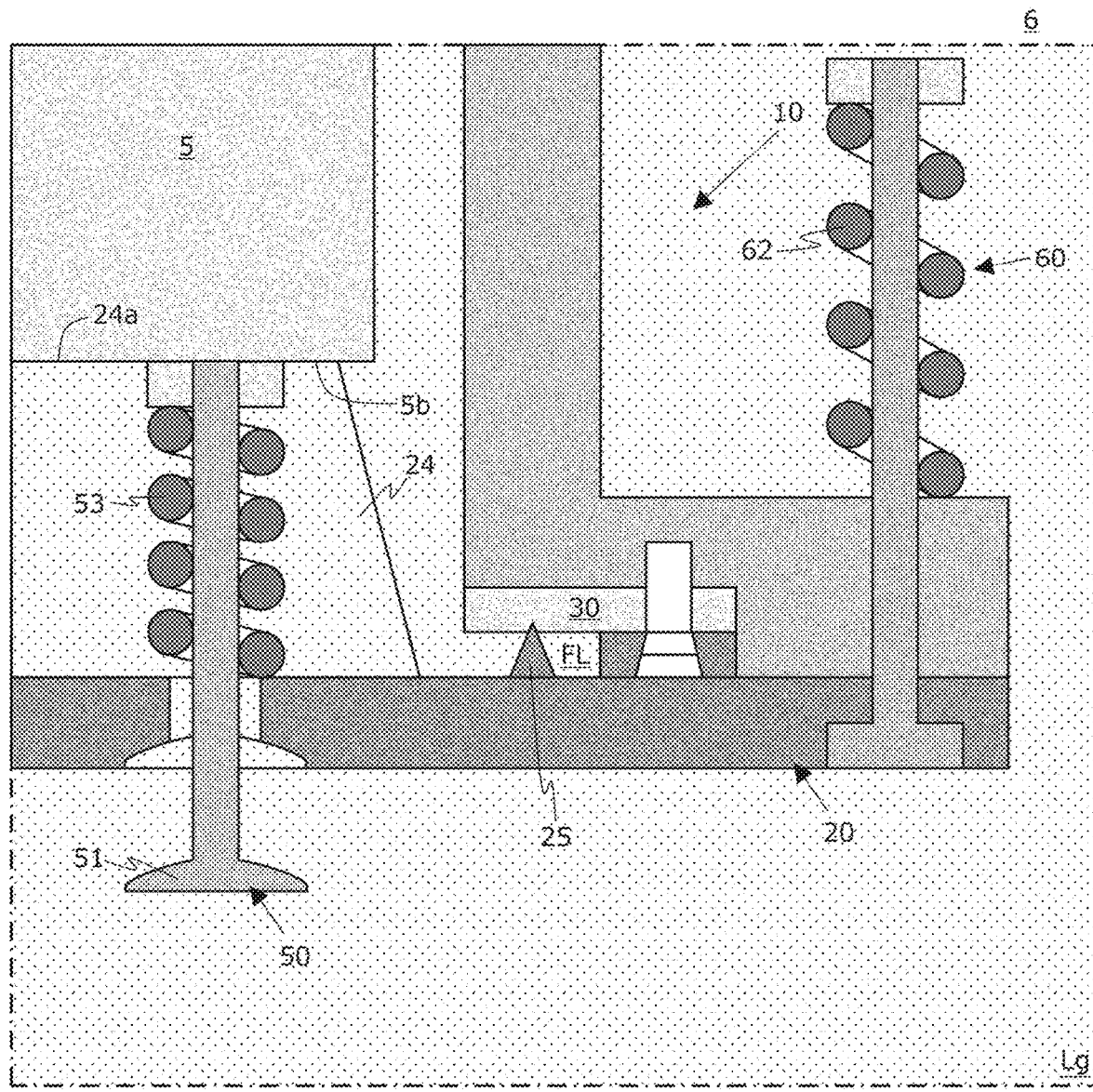
FIG. 5 is a schematic enlarged cross-sectional view of the foot valve assembly when an auxiliary valve disc included in the foot valve assembly in FIG. 2 is opened, the view enlarging the part A of the foot valve assembly in FIG. 2.

FIG. 5 is a schematic enlarged cross-sectional view of the foot valve assembly 6 with the valve disc 20 closed, the view enlarging the part A of the foot valve assembly 6 in FIG. 2.

While the pump 5 is raised from the lowered position toward the raised position, the valve disc 20 is closed corresponding to the raising of the pump 5 by the biasing force.

Then, when the lower end surface 5*b* of the pump 5 is separated from the upper surface 24*a* of the eddy dissipation plate 24, the pump load to the valve disc 20 is removed, and the biasing force is applied to the valve disc 20 in the valve disc-closing direction. Thus, the valve disc 20 is closed by the biasing force. In this case, the protruding portion 25 is pressed against the sealing member 30 by the biasing force. As a result, the protruding portion 25 and the sealing member 30 block the inflow path FL. In contrast, the auxiliary valve disc 51 is still opened by the pump load.

Then, when the pump 5 is further raised, the pump load applied to the auxiliary valve disc 51 decreases, and the auxiliary valve disc 51 is closed corresponding to the raising of the pump 5 by the auxiliary biasing force.

Figure 6:
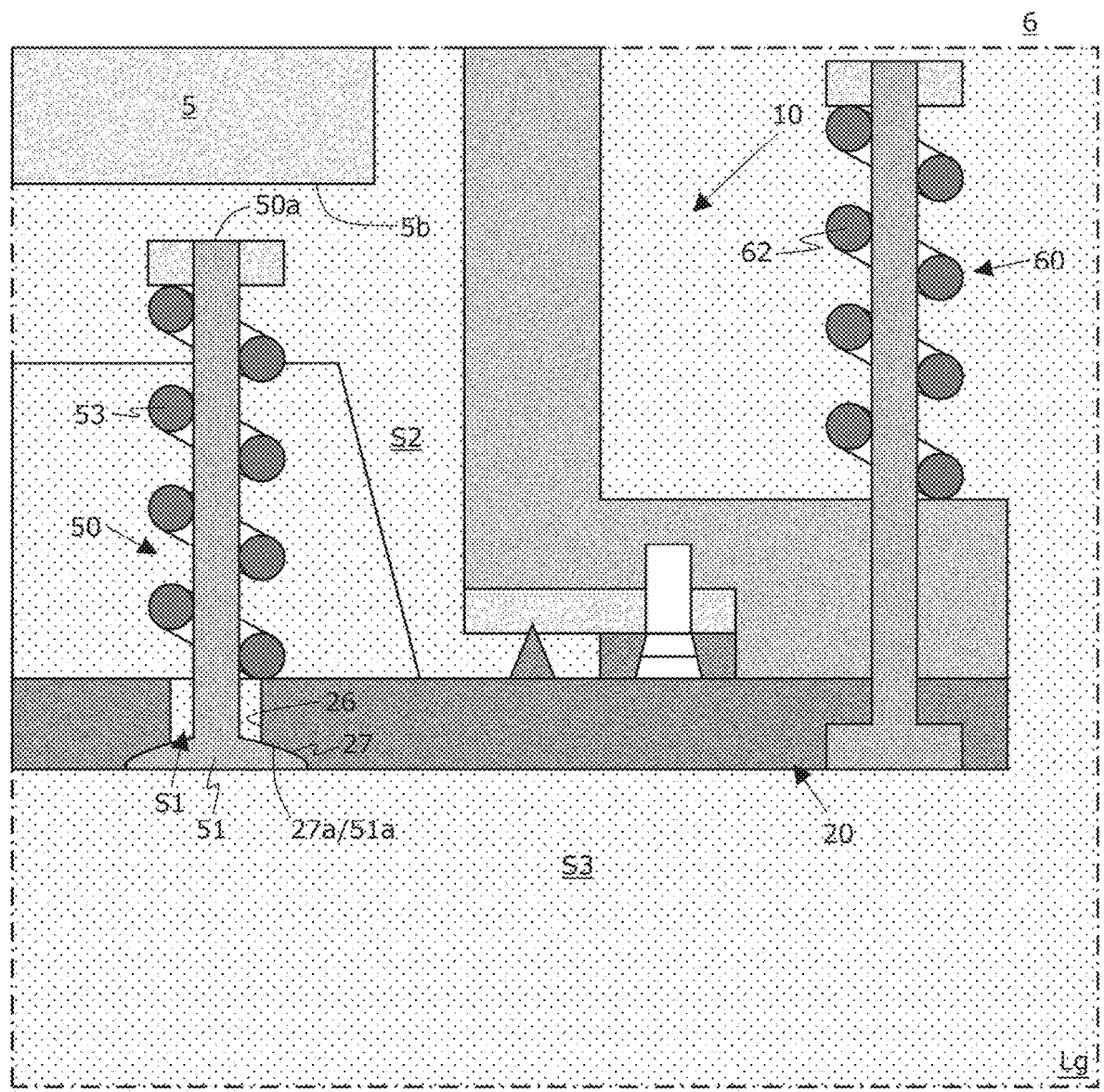
FIG. 6 is a schematic enlarged cross-sectional view of the foot valve assembly when the auxiliary valve disc included in the foot valve assembly in FIG. 2 is closed, the view enlarging the part A of the foot valve assembly in FIG. 2.

FIG. 6 is a schematic enlarged cross-sectional view of the foot valve assembly 6 with the auxiliary valve disc 51 closed, the view enlarging the part A of the foot valve assembly 6 in FIG. 2.

When the lower end surface 5b of the pump 5 is separated from the upper surface 50a of the auxiliary valve 50, the pump load to the auxiliary valve disc 51 is removed, and the auxiliary biasing force is applied to the auxiliary valve disc 51 in the closing direction of the auxiliary valve disc 51. Thus, the auxiliary valve disc 51 is closed by the auxiliary biasing force. When the auxiliary valve disc 51 is closed, the upper surface 51a of the auxiliary valve disc 51 is liquid-tightly brought into contact with the lower surface 27a of the recess portion 27. As a result, the auxiliary valve disc 51 blocks the insertion hole 26 (the cylindrical space S1). In this case, an internal space S2 surrounded by the adapter 10 and the valve disc 20 is separated from an external space S3 (inside the storage tank T) around the adapter 10 and the valve disc 20.

Herein, the internal space S2 is also contiguous to the space in the pump column 2. Thus, in the following description, the internal space S2 and the space in the pump column 2 will be collectively referred to as the internal space S2 for convenience of description.

Operation from Introduction of Inert Gas to and After End of Introduction

For example, when the pump 5 is taken out of the pump column 2 and when the pump 5 is disposed in the pump column 2 from the outside of the pump column 2, closing of the valve disc 20 and the auxiliary valve disc 51 and removing (purging) the residual gas (the liquefied gas Lg and the vaporized liquefied gas Lg) in the pump column 2 by using the inert gas are performed. The operation of the foot valve assembly 6 from the introduction of the inert gas to the end of the introduction will be described below.

Figure 7:
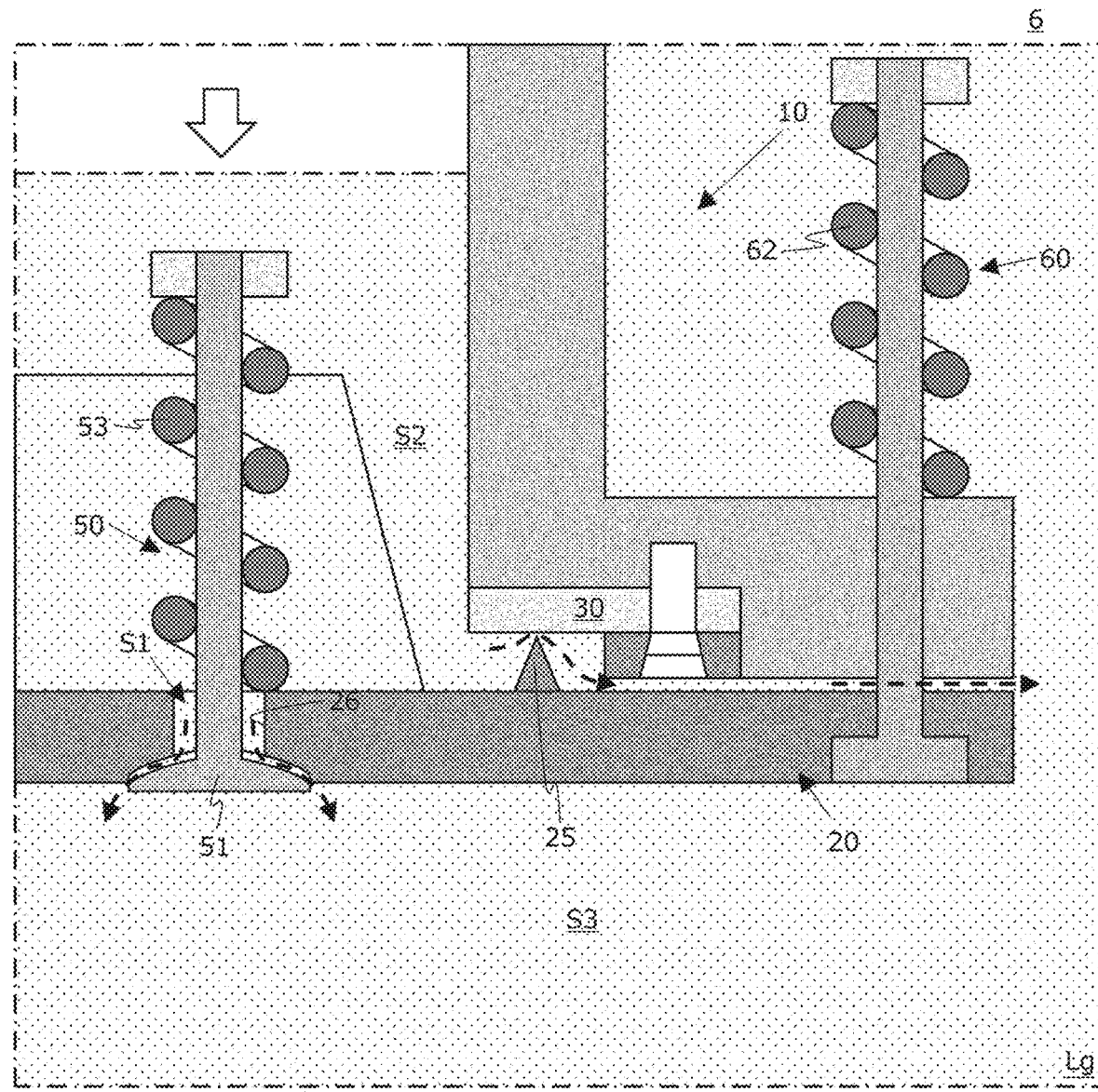
FIG. 7 is a schematic enlarged cross-sectional view of the foot valve assembly in introducing an inert gas, the view enlarging the part A of the foot valve assembly in FIG. 2.

FIG. 7 is a schematic enlarged cross-sectional view of the foot valve assembly 6 in introducing the inert gas, the view enlarging the part A of the foot valve assembly 6 in FIG. 2.

The figure illustrates the flow of the inert gas with white arrows and the flow of the residual gas with dashed arrows.

When the inert gas is introduced into the pump column 2, the residual gas in the pump column 2 is pressed downward by the pressure of the inert gas. In this case, the auxiliary valve disc 51 is opened against the auxiliary biasing force. As a result, the residual gas is discharged into the external space S3 (the storage tank T) through the insertion hole 26 (the cylindrical space S1). The valve disc 20 is opened slightly against the biasing force. As a result, a small gap occurs between an upper end portion of the protruding portion 25 and the sealing member 30, and the residual gas is discharged into the external space S3 (the storage tank T) through the gap.

Figure 8:
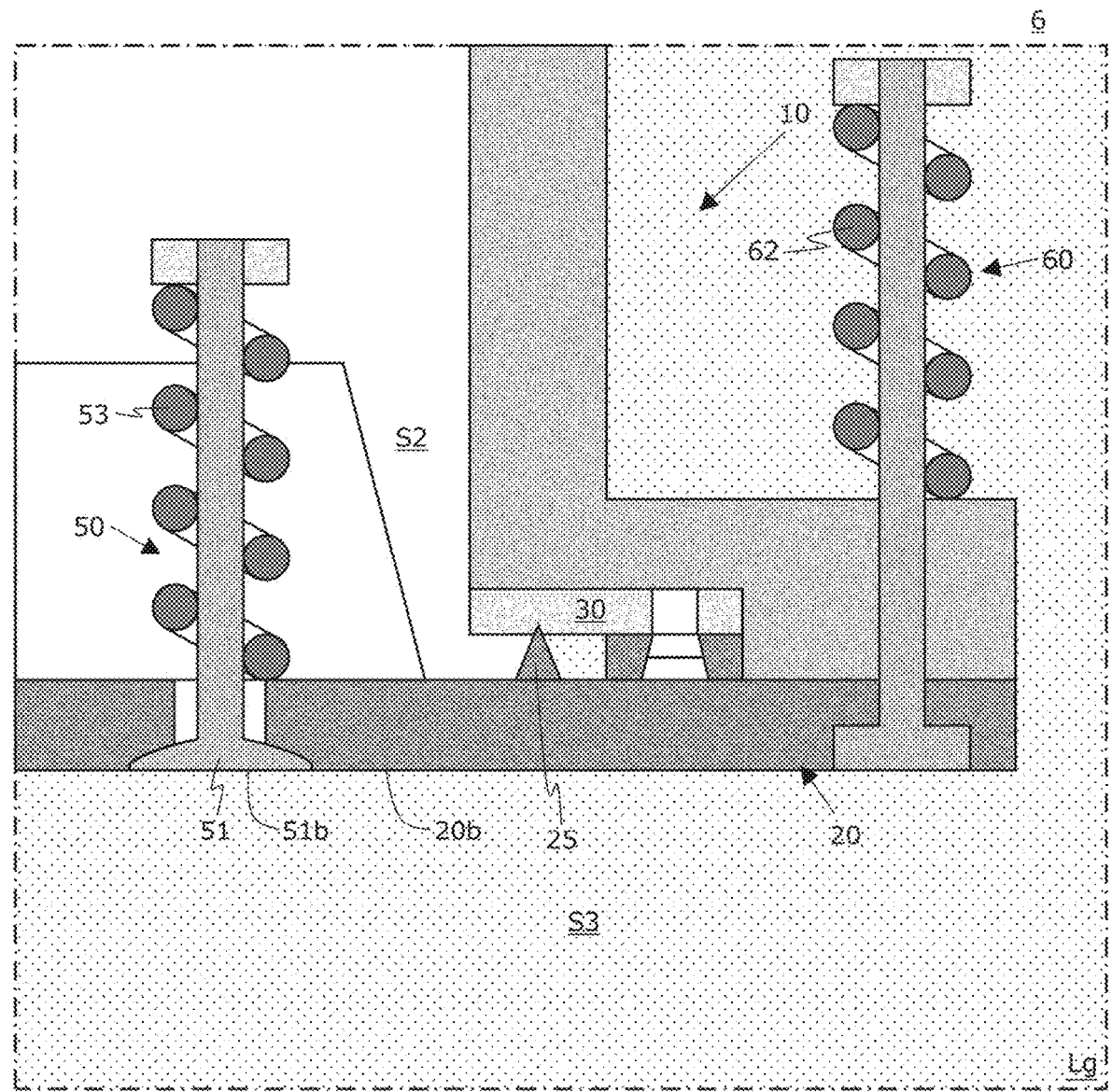
FIG. 8 is a schematic enlarged cross-sectional view of the foot valve assembly at the time of ending the introduction of the inert gas, the view enlarging the part A of the foot valve assembly in FIG. 2.

FIG. 8 is a schematic enlarged cross-sectional view of the foot valve assembly 6 after ending the introduction of the inert gas, the view enlarging the part A of the foot valve assembly 6 in FIG. 2.

When the introduction of the inert gas into the pump column 2 ends (when the residual gas has been purged), the internal space S2 is filled with the inert gas. In this case, the liquid pressure (hereinafter referred to as "external liquid pressure") depending on liquid volume (liquid level) of the liquefied gas Lg stored in the storage tank T is applied to the valve disc 20 and the auxiliary valve disc 51 in the closing direction of the valve disc 20 and the auxiliary valve disc 51. Accordingly the valve disc 20 is biased in the valve disc-closing direction by the biasing force and the external liquid pressure, and the valve disc 20 is closed. In this case, the protruding portion 25 is pressed against the sealing member 30 by the biasing force and the external liquid pressure. In contrast, the auxiliary valve disc 51 is biased in the closing direction of the auxiliary valve disc 51 by the auxiliary biasing force and the external liquid pressure, and the auxiliary valve disc 51 is closed. Herein, the area of the lower surface 20b of the valve disc 20 is sufficiently larger (e.g., several tens to several hundred times) than the area of the lower surface 51b of the auxiliary valve disc 51. Thus, the external liquid pressure applied to the auxiliary valve disc 51 is sufficiently smaller (e.g., one-several tens to one-several hundredths) than the external liquid pressure applied to the valve disc 20.

Then, the head plate 3a is removed from the pump column 2, and the pump 5 is taken out of the pump column 2 and maintenance for the pump 5 is performed. After the maintenance ends, the pump 5 is returned into the pump column 2 and is lowered to the raised position in a state suspended by the lift shaft 3b. Then, the head plate 3a is attached to the pump column 2.

Operation While Pump is Lowered from Raised Position to Lowered Position

Figure 9:
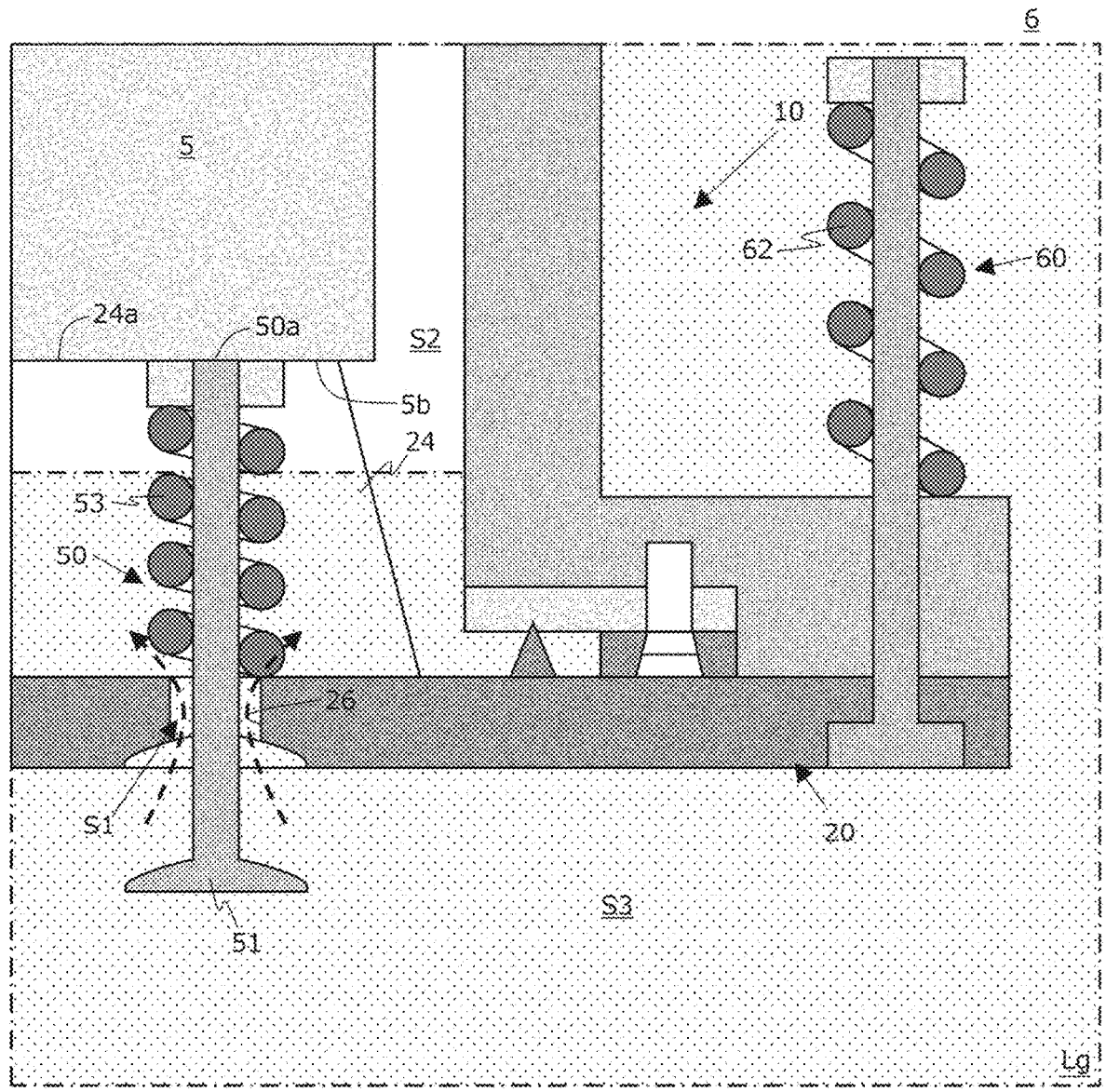
FIG. 9 is a schematic enlarged cross-sectional view of the foot valve assembly when the auxiliary valve disc in FIG. 6 is opened, the view enlarging the part A of the foot valve assembly in FIG. 2.

FIG. 9 is a schematic enlarged cross-sectional view of the foot valve assembly 6 with the auxiliary valve disc 51 opened, the view enlarging the part A of the foot valve assembly 6 in FIG. 2.

While the pump 5 is lowered from the raised position to the lowered position, the lower end surface 5b of the pump 5 abuts on the upper surface 50a of the auxiliary valve 50. As a result, the pump load is applied to the auxiliary valve 50 in the opening direction of the auxiliary valve disc 50. In this case, the auxiliary biasing force and the external liquid pressure are applied to the auxiliary valve disc. 51 in the closing direction of the auxiliary valve disc 51, and the pump load is applied in the opening direction of the auxiliary valve disc 51. Herein, as described above, the auxiliary biasing force is smaller than the pump load and the biasing force. The external liquid pressure applied to the auxiliary valve disc 51 is smaller than the pump load. In the auxiliary valve disc 51, the force (the pump load) in the opening direction of the auxiliary valve disc 51 is larger than the force (the auxiliary biasing force and the external liquid pressure) in the closing direction of the auxiliary valve disc 51. Accordingly, when the pump load is applied to the auxiliary valve 50, the auxiliary valve disc 51 starts to open due to the pump load. In this case, the internal space S2 communicates with the inside of the storage tank T (the external space S3) via the insertion hole 26 (the cylindrical space S1). As a result, the liquefied gas Lg starts to flow into the internal space S2 through the insertion hole 26 (the cylindrical space S1). In this way, the insertion hole 26 functions as the communication hole in the present invention.

Then, when the pump 5 is further lowered, the auxiliary valve disc 51 is opened corresponding to the lowering of the pump 5.

Then, when the pump 5 is further lowered, the lower end surface a of the pump 5 abuts on the upper surface 24a of the eddy dissipation plate 24. As a result, the pump load is applied to the valve disc 20 in the valve disc-opening direction. In this case, the biasing force and the external liquid pressure are applied to the valve disc 20 in the valve disc-closing direction, and the pump load and the liquid pressure (hereinafter referred to as "internal liquid pressure") due to the liquefied gas Lg in the internal space S2 are applied in the valve disc-opening direction. Herein, the biasing force is smaller than the pump load. As described above, the external liquid pressure applied to the valve disc 20 is large enough to resist the pump load together with the biasing force. In the valve disc 20, when a liquid pressure difference between the external liquid pressure and the internal liquid pressure is large, the force in the valve disc-opening direction (the pump load and the internal liquid pressure) is smaller than the force in the valve disc-closing direction (the biasing force and the external liquid pressure). Accordingly, even when the pump load is applied to the valve disc 20, the valve disc 20 is not opened.

When the auxiliary valve disc 51 is opened and the valve disc 20 is closed, the liquefied gas Lg flows into the internal space S2 through the insertion hole 26 (the cylindrical space S1). Thus, the internal liquid pressure applied to the valve disc 20 increases as the liquid level of the liquefied gas Lg in the internal space S2 rises, and the internal liquid pressure becomes approximately equal to the external liquid pressure when the liquid level becomes the same as the liquid level of the liquefied gas Lg in the storage tank T. That is, when the liquid level of the liquefied gas Lg in the internal space S2 rises, the liquid pressure difference decreases, and the force to the valve disc 20 in the valve disc-closing direction decreases. When the difference between the pump load and the biasing force becomes larger than the liquid pressure difference, the valve disc 20 starts to open due to the pump load. Finally, when a part of the pump 5 abuts on the inclined surface 14 and the pump 5 is located in the lowered position, the valve disc 20 is in the maximum open state as illustrated in FIG. 4.

In this way, in the foot valve assembly 6, when the pump 5 is lowered, the auxiliary valve disc 51 is opened prior to the valve disc 20, and the liquid pressure difference with respect to the valve disc 20 is reduced, thereby assisting in opening the valve disc 20 when the valve disc 20 is closed. As a result, in the foot valve assembly 6, the biasing force can be increased to a value close to the pump load. In a conventional foot valve assembly without the auxiliary valve 50, when the biasing force is increased, an auxiliary operation such as increasing the pressure in the pump column 2 by introducing the gas into the pump column 2 and assisting the valve disc in opening is required. However, in the foot valve assembly 6, such auxiliary operation is not required, and the valve disc 20 is stably opened under the own weight of the pump 5 (the pump load). Accordingly the biasing force of the foot valve assembly 6 can be set larger than the conventional structure without considering the liquid pressure difference and the auxiliary operation. Thus, the sealability of the foot valve assembly 6 (the sealability of the protruding portion 25 and the sealing member 30) is improved over the sealability of the conventional foot valve assembly.

Herein, in the present embodiment, the handling liquid is liquefied ammonia, and the vaporized liquefied gas 14 is ammonia gas that, is flammable and highly toxic to a living body. Since the ammonia gas is lighter than the air, the ammonia gas is easily breathed in by a maintenance worker. As described above, the foot valve assembly 6 according to the present invention has a higher sealability than a conventional foot valve assembly. Thus, in the submerged pump system 1 according to the present invention, even when the handling liquid is a liquid that is difficult to handle such as liquefied ammonia, safe maintenance work can be performed.

Conclusion

According to the embodiment described above, the foot valve assembly 6 includes the adapter 10, the valve disc 20, the spring 62, and the auxiliary valve 50. The adapter 10 is attached to the lower opening end 2b of the pump column 2. The valve disc 20 opens and closes a lower opening 11a of the cylindrical body portion 11 corresponding to the raising and lowering of the pump 5. The spring 62 biases the valve disc 20 toward the adapter 10 side. The auxiliary valve 50 is opened and closed corresponding to the raising and lowering of the pump 5 and assists in opening the valve disc 20 when the valve disc 20 is closed. According to this configuration, the biasing force of the foot valve assembly 6 can be set larger than the conventional structure without considering the liquid pressure difference and the auxiliary operation. Thus, the sealability of the foot valve assembly 6 is improved over the sealability of the conventional foot valve assembly. Accordingly, the foot valve assembly 6 is able to stably open the valve disc 20 under the own weight of the pump 5 (the pump load) while ensuring high sealability.

According to the embodiment described above, when the pump 5 is lowered and abuts on the valve disc 20 and the auxiliary valve 50, the auxiliary valve 50 is opened prior to the valve disc 20. According to this configuration, the auxiliary valve 50 is opened, and thus the liquefied gas Lg flows into the foot valve assembly 6. As a result, the liquid pressure difference with respect to the valve disc 20 decreases, and as a force applied to the valve disc 20, the biasing force is dominant in the valve disc-closing direction, and the pump load is dominant in the valve disc-opening direction. Accordingly, the valve disc 20 is easily opened by the pump load. In this way, the auxiliary valve 50 is able to assist in opening the valve disc 20 without requiring an auxiliary operation by eliminating the liquid pressure difference when the valve disc 20 is closed. Thus, the foot valve assembly 6 is able to stably open the valve disc 20 under the own weight of the pump 5 (the pump load) while ensuring high sealability.

According to the embodiment described above, the foot valve assembly 6 includes the insertion hole 26. The insertion hole 26 allows the internal space S2 and the external space S3 to communicate with each other when the valve disc 20 is closed. The auxiliary valve 50 opens and closes the insertion hole 26 the cylindrical space S1). According to this configuration, the auxiliary valve 50 is opened when the valve disc 20 is closed, and thus the liquefied gas Lg in the external space S3 flows into the internal space S2. As a result, as described above, the auxiliary valve 50 is able to assist in opening the valve disc 20 without requiring an auxiliary operation by eliminating the liquid pressure difference when the valve disc 20 is closed. Thus, the foot valve assembly 6 is able to stably open the valve disc 20 under the own weight of the pump 5 (the pump load) while ensuring high sealability.

According to the embodiment described above, the insertion hole 26 is disposed through the valve disc 20. According to this configuration, the foot valve assembly 6 according to the present invention can be easily achieved by only performing simple processing (formation of the through hole and attachment of the auxiliary valve 50) to only the valve disc of the conventional foot valve assembly.

According to the embodiment described above, the auxiliary valve 50 includes the auxiliary valve disc 51 and the spring 53. The auxiliary valve disc 51 opens and closes the insertion hole 26, and the spring 53 biases the auxiliary valve disc 51 toward the closing direction of the auxiliary valve disc 51. The biasing force is smaller than the pump load and larger than the auxiliary biasing force. According to this configuration, when the valve disc 20 is closed, the auxiliary valve disc 51 can be opened prior to the valve disc 20. As a result, as described above, the auxiliary valve 50 is able to assist in opening the valve disc 20 without requiring an auxiliary operation by eliminating the liquid pressure difference when the valve disc 20 is closed. Thus, the foot valve assembly 6 is able to stably open the valve disc 20 under the own weight of the pump 5 (the pump load) while ensuring high sealability.

Other Embodiments

In the embodiment described above, the adapter 10 may include the insertion hole 26, and the auxiliary valve 50 may be disposed penetrating the adapter 10. In this case, for example, the insertion hole 26 may penetrate a part of the cylindrical body portion 11 (e.g., the inclined surface 14).

In the embodiment described above, the valve disc 20 may include a plurality of insertion holes 26. In this case, the foot valve assembly 6 includes a plurality of auxiliary valves 50 corresponding to the insertion holes 26. In the circumferential direction of the valve disc 20, the plurality of insertion holes 26 may be disposed at equal intervals. In this configuration, the liquefied gas Lg flows into the internal space 82 through the plurality of insertion holes 26. Thus, the time required to eliminate the liquid pressure difference is shortened.

In the embodiment described above, the position of the insertion hole 26 may be any position that allows the upper surface 50a of the auxiliary valve 50 to abut on the pump 5 when the pump 5 is lowered, and the position of the insertion hole 26 is not limited to the position in the present embodiment. That is, for example, the insertion hole 26 may be disposed through the top surface 21a of the convex portion 21.

In the embodiment described above, the configuration of the auxiliary valve 50 is not limited to the poppet valve. That is, for example, the auxiliary valve 50 may include a solenoid valve that opens and closes the insertion hole 26. In this case, for example, the auxiliary valve 50 may be manually opened and closed or may be automatically opened and closed based on a sensor that detects whether or not the pump 5 and the valve disc 20 abut on each other.

In the embodiment described above, the shaft member 52 may be formed separately from the auxiliary valve disc 51 and attached to the upper surface 51a of the auxiliary valve disc 51.

In the embodiment described above, the foot valve assembly 6 may include a sealing member disposed between the recess portion 27 and the auxiliary valve disc 51. In this case, for example, any one of the recess portion 27 or the auxiliary valve disc 51 may include a groove in which the sealing member is disposed. For example, the sealing member may be attached to the auxiliary valve disc 51 so as to cover the outer edge portion of the auxiliary valve disc 51.

In the embodiment described above, the lower end portion of the insertion hole 26 need not be enlarged in diameter. That is, the valve disc 20 need not include the recess portion 27. In this case, for example, the upper surface 51a of the auxiliary valve disc 51 may be plate-shaped and may liquid-tightly abut on the lower surface 20b of the valve disc 20 when the auxiliary valve disc 51 is closed.

In the embodiment described above, the shape of the lower surface 27a of the recess portion 27 may correspond to the shape of the upper surface 51a of the auxiliary valve disc 51 and is not limited to the shape in the present embodiment.

In the embodiment described above, the shape of the auxiliary valve disc 51 (the shape of the upper surface 51a) may be any shape that allows the insertion hole 26 to be blocked when the auxiliary valve disc 51 is closed, and the shape of the auxiliary valve disc 51 is not limited to the shape in the present embodiment. That is, for example, the auxiliary valve disc 51 may have a spherical shape, a conical shape, or a disc shape.

In the embodiments described above, the cross-sectional shape of the top of the protruding portion 25 is not limited to the illustrated shape (triangular shape). That is, for example, the cross-sectional shape thereof may be semicircular or flat.

In the embodiments described above, the material of the sealing member 30 may be any material that functions as a sealing material against the handling liquid and is not limited to PTFE.

Aspects of the Present Invention

Next, aspects of the present invention conceived from the embodiments described above will be described below with reference to the terms and reference signs described in the embodiments.

A first aspect of the present invention is a foot valve assembly (e.g., the foot valve assembly 6) including: a cylindrical adapter (e.g., the adapter 10) attached to a lower opening end (e.g., the lower opening end 2b) of a cylindrical pump column (e.g., the pump column 2) configured to accommodate a pump (e.g., the pump 5) configured to be submerged in a handling liquid (e.g., the liquefied gas Lg), the adapter configured to accommodate a suction port (e.g., the suction port 5a) of the pump; a disc-shaped valve disc (e.g., the valve disc 20) configured to open and close a lower opening (e.g., the lower opening 11a) of the adapter corresponding to raising and lowering of the pump; a biasing member (e.g., the spring 62) that biases the valve disc toward the adapter; and an auxiliary valve (e.g., the auxiliary valve 50) configured to open and close corresponding to the raising and lowering the pump and configured to assist the valve disc in opening and closing when the valve disc is closed.

According to this configuration, the foot valve assembly is able to stably open the valve disc under the own weight of the pump (the pump load) while ensuring high sealability.

A second aspect of the present invention is the foot valve assembly in the first aspect, in which, when the pump is lowered and abuts on the valve disc and the auxiliary valve, the auxiliary valve is opened prior to the valve disc.

According to this configuration, when the valve disc is closed, the liquid pressure difference with respect to the valve disc decreases due to the liquefied gas flowing in from the auxiliary valve, and the valve disc is easily opened by the pump load.

A third aspect of the present invention is the foot valve assembly in the first or second aspect, further including a communication hole (e.g., the insertion hole 26) that allows an internal space (e.g., the internal space S2) surrounded by the adapter and the valve disc and an external space (e.g., the external space S3) around each of the adapter and the valve disc to communicate with each other when the valve disc is closed, in which the auxiliary valve opens and closes the communication hole.

According to this configuration, the auxiliary valve is opened when the valve disc is closed, and thus the liquefied gas in the external space flows into the internal space. As a result, the liquid pressure difference decreases when the valve disc is closed, and the foot valve assembly is able to assist in opening the valve disc without requiring an auxiliary operation.

A fourth aspect of the present invention is the foot valve assembly in the third aspect, in which the communication hole is disposed through the valve disc.

According to this configuration, the foot valve assembly according to the present invention can be easily achieved by only performing simple processing to only the valve disc of the conventional foot valve assembly.

A fifth aspect of the present invention is the foot valve assembly in the third or fourth aspect, in which the auxiliary valve includes an auxiliary valve disc (e.g., the auxiliary valve disc 51) configured to open and close the communication hole, and an auxiliary biasing member (e.g., the spring 53) that biases the auxiliary valve disc toward a closing direction of the auxiliary valve disc, and a biasing force applied to the valve disc by the biasing member is smaller than the pump load applied to the valve disc by the pump and larger than the biasing force applied to the auxiliary valve disc by the auxiliary biasing member.

According to this configuration, when the valve disc is closed, the auxiliary valve disc can be opened prior to the valve disc.

A sixth aspect of the present invention is a submerged pump system (e.g., the submerged pump system 1) including: a pump configured to be submerged in a handling liquid; a cylindrical pump column configured to accommodate the pump; and the foot valve assembly according to any one of the first to the fifth aspects.

According to this configuration, in the submerged pump system, when the valve disc is closed, the liquid pressure difference with respect to the valve disc decreases due to the liquefied gas flowing in from the auxiliary valve, and the valve disc is easily opened by the pump load.

What is claimed is:

1. A foot valve assembly, comprising:
   a cylindrical adapter attached to a lower opening end of a cylindrical pump column configured to accommodate a pump configured to be submerged in a handling liquid, the cylindrical adapter configured to accommodate a suction port of the pump;
   a valve disc configured to open and close a lower opening of the cylindrical adapter corresponding to raising and lowering of the pump;
   a biasing member that biases the valve disc toward the cylindrical adapter; and
   an auxiliary valve configured to open and close corresponding to the raising and lowering of the pump and configured to assist in opening the valve disc, when the valve disc is closed the handling liquid is allowed through the auxiliary valve before opening the valve disc, wherein
   the valve disc includes a communication hole that penetrates the valve disc in a vertical direction,
   the auxiliary valve includes an auxiliary valve disc that is configured to open and close the communication hole,
   wherein, when the auxiliary valve disc is open, the auxiliary valve disc is disposed below the valve disc and spaced apart from the valve disc,
   the communication hole communicates with an internal space that is surrounded by the cylindrical adapter and the valve disc and with an external space around the cylindrical adapter and the valve disc, thereby allowing the handling liquid to flow into the internal space, and
   wherein, when the auxiliary valve disc closed,
   the auxiliary valve disc is liquid-tightly brought into contact with a lower surface of the valve disc, thereby separating the internal space from the external space.

2. The foot valve assembly according to claim 1, wherein the auxiliary valve includes;
   an auxiliary biasing member that biases the auxiliary valve disc toward a closing direction of the auxiliary valve disc, and
   wherein a biasing force applied to the valve disc by the biasing member is
   smaller than a pump load applied to the valve disc by the pump, and
   larger than a biasing force applied to the auxiliary valve disc by the auxiliary biasing member.

3. A submerged pump system, comprising:
   the pump configured to be submerged in the handling liquid;
   the cylindrical pump column configured to accommodate the pump; and
   the foot valve assembly according to claim 1.

* * * * *